United States Patent

[11] 3,633,267

[72] Inventors Czeslaw Deminet
 Kent;
 James W. Patten, Seattle; Hendrik H. Van der Mark, Bellevue, all of Wash.
[21] Appl. No. 787,408
[22] Filed Dec. 27, 1968
[45] Patented Jan. 11, 1972
[73] Assignee The Boeing Company
 Seattle, Wash.

[54] METHOD OF DIFFUSION BONDING HONEYCOMB COMPOSITE STRUCTURES
12 Claims, 2 Drawing Figs.

[52] U.S. Cl...................................................... 29/493,
 161/68, 161/161
[51] Int. Cl........................................................ B23k 31/02
[50] Field of Search........................................... 156/104,
 156, 179, 285; 75/208, 224, 225; 29/194, 195,
 470, 472.1, 471.1, 472.3, 464, 423, 493; 161/68,
 161

[56] References Cited
 UNITED STATES PATENTS
2,546,320 3/1951 Rostron........................ 75/224
2,767,463 10/1956 Tacvorian..................... 75/224
3,067,507 12/1962 Titus............................. 156/286

OTHER REFERENCES

Diffusion Welding of Commercially Pure Titanium, King et al., Welding Journal, July 1967, pp. 289–s– 293s and 298–s.
Additional Studies on the Diffusion Welding of Titanium, King et al., IBID, Oct. 1968, pp. 444–s, 445–s, and 450–s.
Diffusion Welding and Brazing of Titanium 6A1– 4V Process Development, Perun et al., Sept. 1967, 385–s and 398–s.

Primary Examiner—Carl D. Quarforth
Assistant Examiner—P. A. Nelson
Attorneys—Glenn Orlob, Kenneth M. MacIntosh and Kenneth W. Thomas ABSTRACT: A method of diffusion bonding fragile metallic honeycomb-type cellular core to metallic face sheets without crushing the core and providing a controlled atmosphere sealed within the core cell spaces. At least one face sheet is initially spaced apart from the core in a furnace as a controlled atmosphere is formed in the furnace and its temperature elevated causing the spacers to yield and the face sheets to assume surface contact with the core. Compressive force applied through a yieldable media to the face sheets and the core diffusion bonds them and seals the controlled atmosphere within the core cell spaces.

PATENTED JAN 11 1972

3,633,267

INVENTORS:
CZESLAW DEMINET
JAMES W. PATTEN
HENDRIK H. VANDERMARK
BY
Kenneth M. MacIntosh
ATTORNEY

METHOD OF DIFFUSION BONDING HONEYCOMB COMPOSITE STRUCTURES

BACKGROUND OF THE INVENTION

This invention pertains to a method for fabricating a metallic composite structure having a cellular core component bonded to one or more face sheets. More particularly, this invention provides a method of diffusion bonding titanium face sheets to a titanium honeycomb core.

Honeycomb structural panels have found wide application in the aerospace industry primarily because of the excellent strength to weight ratios obtained with such composite structures. Perhaps the most widely applied honeycomb structure is that made of aluminum wherein an aluminum core component is sandwiched between and either adhesive bonded, brazed, or welded to two aluminum face sheets. However, in order to meet the demands of more advanced aerospace applications, materials possessing higher strength and higher temperature capabilities are being considered. Typical of these more exotic materials are titanium and the refractory metals including columbium, molybdenum and tungsten and their alloys. The widespread adoption of these materials has been delayed partly due to the unavailability of a method for fabricating honeycomb composite structures that do not compromise the inherent high strength and high temperature capabilities of the basic materials. Because the metallurgical characteristics of these metals and alloys are different than those of the aluminum and aluminum alloys, the fabrication techniques that were found to be adequate for manufacturing aluminum honeycomb have proved unsatisfactory when applied to the manufacture of high-strength metal honeycomb composites.

Diffusion bonding is a technique that has recently generated considerable interest as a method of fabricating structures made of titanium and other high strength metals. Generally, diffusion bonding of materials refers to a process wherein entirely solid state diffusion phenomena are used to form the joint. To achieve diffusion bonding, two conditions must be met: (1) intimate contact must be achieved between the surface planes of the two materials to be joined; and (2) sufficient driving force must be applied to the materials to provide an adequate diffusion coefficient. Intimate contact between the surface planes of the materials to be joined is usually achieved by applying sufficient compressional force to the materials to cause a breakdown and displacement of the oxide layers and other irregularities normally found on the surfaces. The driving force is provided by the application of heat to the materials, and by the applied compressive forces.

Diffusion bonding of titanium and other high-strength metals and alloys has been achieved where the structural elements were sufficiently rigid to withstand the relatively high pressure normally used to achieve the intimate contact without permanent deformation or crushing. However, in the case of the fabrication of honeycomb structural panels, the relative fragility of the honeycomb core prevents the application of the compressional forces normally used in the fabrication of other types of components. Great care is required to secure the requisite amount of pressure and heat to obtain a secure uniform bond in the honeycomb structure without also causing the honeycomb core to crush, collapse or otherwise permanently deform to the extent that it loses its structural strength. Therefore, the successful diffusion bonding to face sheets directly to a honeycomb core has only been achieved with the high strength metals, if at all, where the thickness of the core foil has been sufficiently large to withstand the bonding pressure; and where the surfaces of the core material have been machined or chemically milled to extremely close tolerances to ensure uniform intimate contact between the surface sheets and the core.

U.S. Pat. No. 3,365,787 has attempted to solve many of these problems by introducing a yieldable intermediate material between the face sheet and the edges of the core cells that yields to accommodate variations in core thickness and then diffuses into the face sheet and core material as the bond is achieved. However, the intermediate material has been found to form intermetallic compounds in the area of the diffusion bond that are brittle. These brittle intermetallic compounds greatly restrict the load carrying ability of a structural panel so made because of the susceptibility of these intermetallic compounds to early fracture. Therefore, the true strength characteristics of the high-strength metals have not been able to be successfully exploited.

SUMMARY OF THE INVENTION

It is an object of this invention to provide a method of diffusion bonding metallic face sheets to a relatively fragile metallic cellular core material without causing the core material.

It is another object of this invention to provide a method of fabricating a metallic composite structure of a cellular core containing a controlled atmosphere sealed therein sandwiched between and diffusion bonded to two face sheets.

It is a further object of this invention to provide a method of fabricating a metallic composite structure having an evacuated cellular core sandwiched between and uniformly diffusion bonds to two face sheets without causing local crushing of the core material due to irregularities in the core thickness.

These and other objects of this invention are achieved by assembling the cellular core material and the face sheets in a furnace with at least one of the face sheets spaced apart from the core material with heat yieldable spacers or supports positioned about the periphery of the core that have a yield point at an elevated temperature. A controlled atmosphere is then formed in the furnace and the temperature of the furnace elevated to at least the yield point of the spacers or supports. A compressive force applied between the face sheets and the core material overcomes the yield strength of the spacers or supports and urges the face sheets into intimate surface contact with the core material forming a diffusion bond along substantially the entire interface therebetween and sealing the controlled atmosphere within the cell spaces of the core material. The compressive force is applied through a heat yieldable media in surface contact with the outside faces of the face sheets to ensure uniform distribution of the compressive force over the face sheets and to prevent local crushing of the core material due to irregularities in its thickness tolerances.

DESCRIPTION OF THE PREFERRED EMBODIMENTS

Figure 1:
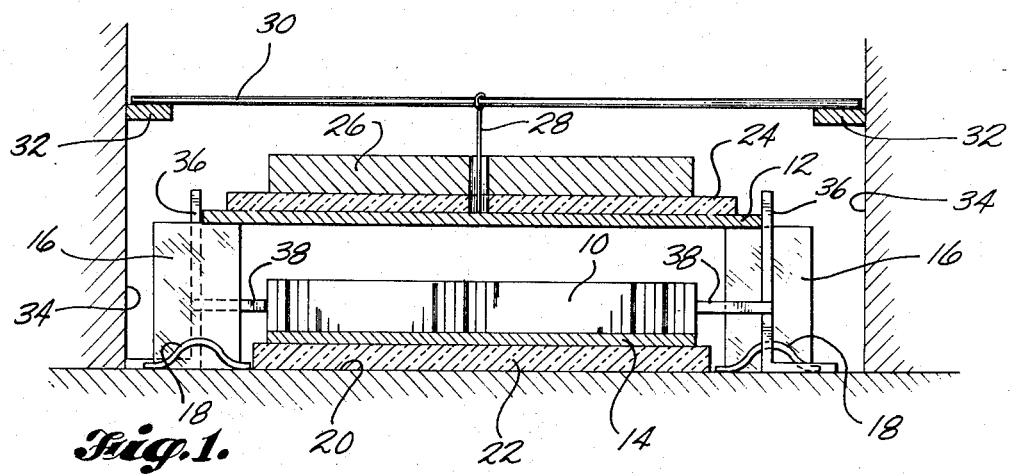
FIG. 1 is an elevational view, partly in section, showing the setup of the structural panel components in the vacuum furnace at the start of the fabrication process.

Referring now to FIG. 1, there is shown an elevational view of a setup within a vacuum furnace for diffusion bonding a cellular core component 10 between an upper face sheet component 12 and a lower face sheet component 14. Typically, the face sheet components 12 and 14 and the cellular core component 10 will be of a material that has been found to be difficult to fabricate into the type of composite structure here under consideration. While the process of this invention has been particularly successful when used with titanium materials, the process is equally applicable to such materials as beryllium, stainless steel, molybdenum, niobium, tungsten, and other refractory metals and alloys. The face sheet components may be of a material different from that of the core component or all of the components may be fabricated from the same metal or alloy. Perhaps the most common of these types of structural composites are the honeycomb sandwich panels in which the core component is a columnar cell hexagonal in cross section. However, the process of this invention is not restricted to such core configurations. Equally satisfactory results are obtained with the core components having columnar cells of either square, rectangular, pentagonal or other regular or irregular cross sectional configurations. Nor need the core component cell be columnar; this invention may be successfully practiced on structural composites where the core component comprises a spongelike metallic matrix to be bonded to the face sheet components. Whether the core component is characterized as having columnar cells or not, the common characteristic is that it is relatively fragile and poses significant difficulties in the diffusion bonding of the core component to the face sheet components. Where the core component is relatively rigid and can sustain high compressional forces, little difficulty is experienced in the diffusion bonding. But the full advantages of these structural composites cannot be obtained unless the core component has thin walled cells and consequent low mass. The process of this invention has therefore been found to be particularly advantageous where the core component comprises a titanium honeycomb having a cell wall thickness of approximately 0.002 inches or less.

Continuing with reference to FIG. 1, cellular core component 10 is therein seen to be resting upon lower face sheet 14 while the upper face sheet 12 is supported above the cellular core 10 on glass supports 16 which are positioned about the periphery of upper face sheet 12. The composition of the glass selected for support 16 is one that possesses a fiber softening point at a temperature below that to which the vacuum furnace will be heated to produce the diffusion bond between cellular core 10 and face sheets 12 and 14. The supporting function of glass support 16 will therefore be temporary and existent only during the initial step of the fabrication cycle. A typical glass that may be used for this application is a borosilicate glass which is inexpensive and possesses desirable chemical and physical properties up to at least 1,700° F. Particularly successful results have been obtained when bonding titanium with the use of a borosilicate glass called KG–33 sold by the Owens-Illinois Corporation. The KG–33 glass exhibits a fiber softening point at about 1,500° F. which is conveniently below the approximate temperature of 1,700° F. which is used for the diffusion bonding of titanium. The glass supports 16 may be in any one of a number of convenient physical configurations such as hollow or square tubes, or solid rods or blocks. It has been found convenient to use relatively thin slabs or plates of borosilicate glass mounted in an upright position by the use of bracket 18 resting on the floor or hearth 20 of the vacuum furnace. Any number of glass supports 16 may be positioned about the periphery of upper face sheet 12 depending upon the thickness, flexibility, and span of the face sheet. Where face sheet 12 is particularly expansive, additional support can be provided near the center by spot welding a wire 28 to a convenient point on the upper face sheet 12 and passing wire 28 through appropriate holes provided in both the pressure pad 24 and the dead weight 26. The upper end of wire 28 is hooked or otherwise fastened to a transversely extending glass support rod 30 which can be positioned above the upper face sheet 12 in any suitable manner, such as by support blocks 32 fastened to vacuum furnace wall 34.

Between the lower face sheet 14 and the vacuum furnace hearth 20 there is positioned a glass pressure pad 22. A similar glass pressure pad 24 is placed on top of the upper face sheet 12 and resting on top of pressure pad 24 is a dead weight 26 which supplied the compressional force necessary to diffusion bond the face sheets 12 and 14 to the cellular core 10 during the bonding phase of the fabrication process. Other methods besides the use of a dead weight 26 may be used to apply compressional bonding force to the face sheets 12 and 14 and the cellular core 10 such as a pneumatic diaphragm, electromechanical solonoid, hydraulic ram, or mechanical leverage system. However, these other devices do not possess the simplicity of the dead weight system and they offer problems such as the introduction of contaminants into the vacuum furnace, the introduction of feedthroughs in the vacuum furnace walls, and problems of operating at temperatures in excess of 1,500° F. Because of its inherent simplicity, the dead weight system illustrated here provides a predetermined uniform compressional force for diffusion bonding the core 10 to the face sheets 12 and 14 independent of the degree of vacuum and the temperature of the vacuum furnace.

Pressure pads 22 and 24 are provided to ensure a uniform distribution of the bonding pressure between face sheets 12 and 14 and cellular core 10. Consequently pressure pads 22 and 24 are selected to be of a material that is sufficiently viscous at the bonding temperature to provide for the even distribution of the bonding compressional force and yet not so plastic as to permit lower face sheet 14 to bottom against the vacuum furnace hearth 20 or dead weight 26 to bottom against upper face sheet 12. It has been found that glass possesses these qualities. While many different types of glass may be used for pressure pads 22 and 24, borosilicate glass of the type used for supports 16 may also be advantageously used here. Some glasses have been found to react chemically with certain metals at the temperature used for diffusion bonding. In particular there is a tendency for borosilicate glass to react with titanium at temperatures below 1,700° F. which causes the formation of a glass coating upon the titanium face sheets 12 and 14 which may prove troublesome to remove. To prevent this metal-glass reaction, the metal may be coated with a stopoff or parting agent before it is placed into contact with the glass pressure pads 22 and 24. A typical parting agent which may be used in the case of a borosilicate glass and titanium alloy metal is a water slurry of boron nitride, zirconia, or other ceramic oxide. In other instances, the metal and the glass will not react at the particular temperature selected for the diffusion bonding process and a parting agent would not be necessary.

In order to prevent the dislodgement of cellular core 10 and upper face sheet 12 due to mechanical vibration or shock during the fabrication process, one or more guides 36 may be positioned about the periphery of upper face sheet 12. Guides 36 have an upright portion which contacts the edge of face sheet 12 and horizontal guide arms 38 engaging cellular core 10. Guides 36 rest on the vacuum furnace hearth 20 and may be fastened thereto by any conventional means.

After the cellular core 10 and face sheets 12 and 14 have been assembled in the vacuum furnace in the manner described above, the furnace is secured, a vacuum drawn, and its temperature elevated. Drawing a vacuum in the vacuum furnace outgases the cellular core and face sheet components, removes organic and other contaminants from these components, and prevents the buildup of oxide on the bonding surfaces of the components as their temperature is raised for diffusion bonding. The vacuum furnace is evacuated before the structure composite components have been heated appreciably. If an adequate vacuum is produced in the vacuum furnace, the oxide buildup on the bonding surfaces at elevated temperatures will require that greater bonding pressure be applied to effect diffusion bonding of the components thus increasing the risk of core crushing particularly when the cellular core 10 has thin cell walls.

The maximum temperature to which the vacuum furnace is to be raised is determined by the crystallographic properties of the cellular core and face sheet components. Some materials exhibit excessive grain growth at elevated temperatures which results in a weak structure. In the case of titanium metal and its alloy, beta phase titanium is known to form at about 1,825° F. to 1,830° F. and since it is generally desirable to prevent the formation of beta phase titanium, the maximum temperature to which the vacuum furnace is heated when diffusion bonding titanium components is approximately 1,700° F. Therefore, while higher temperatures will normally yield a more complete diffusion bond sooner, the maximum temperature that may be used in the practice of this invention will be dictated by what crystallographic changes in the metallic components are sought to be avoided.

Figure 2:
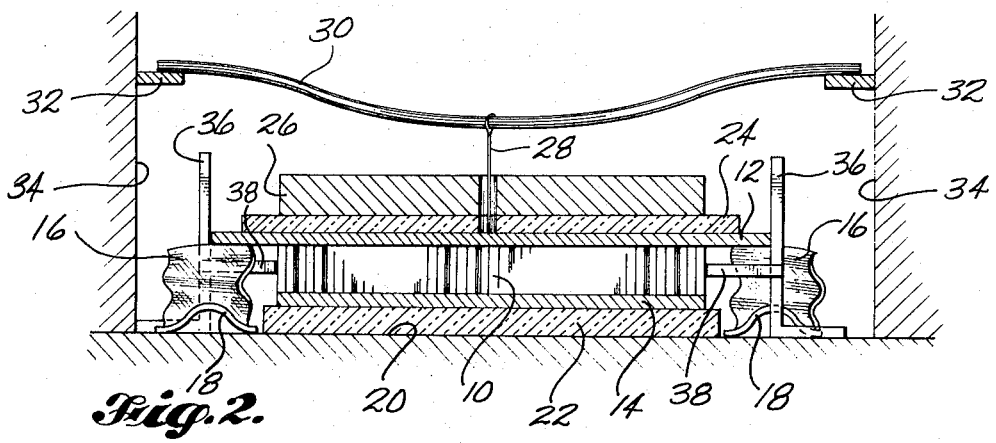
FIG. 2 is an elevational view, partly in section, showing the disposition of the structural panel components during the diffusion bonding phase of the fabrication process.

Referring now to FIG. 2, there is shown an elevational view of the setup as shown in FIG. 1, but after the vacuum furnace has been evacuated and its temperature elevated to the temperature of diffusion bonding of the cellular core 10 to face sheets 12 and 14. However, before the vacuum furnace has reached the diffusion bonding temperature, glass supports 16 and glass rod 30 have softened and yielded permitting upper face sheet 12, under the compressive force exerted by dead weight 26, to lower into contact with the upper surface of cellular core 10. As upper face sheet 12 is lowered into contact with cellular core 10, guides 36 have maintained the alignment between these components with lower face sheet 14. The unique properties of the glass of supports 16 which permit the successful practice of this invention can now be understood. Unlike metals and other crystalline materials, glass is amorphous at all temperatures used in the practice of this invention and only its viscosity changes as the vacuum furnace is elevated to the diffusion bonding temperature. As the glass supports 16 reach their fiber softening temperature, the glass will gradually soften and yield permitting upper face sheet 12 to lower into contact with cellular core 10. This softening phenomenon, or decrease in the glass viscosity, occurs gradually thus avoiding any sudden giving away and impacting of cellular core 10 by upper face sheet 12. Furthermore, the gradual yielding of glass supports 16 and glass rod 30 will be a consistent function of temperature as long as their compositions are maintained relatively constant. This consistent and uniform softening phenomenon possessed by amorphous glass structures is to be distinguished from the sudden melting and other crystallographic changes exhibited by metals in particular and crystalline materials in general. Because of the wide range of glass compositions available, a particular composition can be readily selected that has a fiber softening point below nearly any diffusion bonding temperature that is being used for the practice of this invention.

After upper face sheet 12 has lowered and come to rest upon cellular core 10, as shown in FIG. 2, dead weight 26 applies compressional force to face sheets 12 and 14 and cellular core 10 positioned therebetween. Since pressure pads 22 and 24 are also made of glass, they are also in a softened condition at the diffusion bonding temperature and ensure the uniform distribution of the compressional force across the face sheets 12 and 14 against cellular core 10. A compressional force is usually necessary to effect a diffusion bond in order to ensure intimate contact of the bonding surfaces. The compressional force exerted by dead weight 26 achieves this intimate contact by straightening any irregularities in the fragile cellular core 10 and by breaking up any residual oxide layers that may be present on the bonding surfaces. When bonding titanium face sheets to a titanium honeycomb cellular core having cell wall thickness of approximately 0.001 to 0.002 inch, it has been found desirable to apply a compressional force of approximately 15 p.s.i. measured on the edges of the cell walls at the bond interface. The application of a compressional force of 15 p.s.i. at a bonding temperature of approximately 1,700° F. has produced no measurable permanent deformation or crushing of the nodes of titanium core cells having a wall thickness no greater than 0.002 inch. In the case of a titanium cellular honeycomb core having a wall thickness of less than 0.001 inch, it may be necessary to apply a compressional force less than 15 p.s.i. measured at the bond interface. Of course, greater cell wall thicknesses will be able to sustain higher compressional forces for otherwise similar cell geometry.

It should be noted that during the evacuation of the vacuum furnace and the raising of its temperature to the fiber softening point of glass supports 16 and glass rod 30, face sheet 12 remained supported above and separated from cellular core 10. This separation between face sheet 12 and cellular core 10 increases the conduction of the assembly and ensures that contaminant removal will be obtained throughout the cellular core 10 no matter how expansive it may be. This contaminant removal and prevention of oxide buildup on the bond surfaces has been found essential to provide a uniform bond of face sheets 12 and 14 to cellular core 10.

As the temperature of the vacuum furnace is raised above the fiber softening point of the glass supports to the diffusion bonding temperature, the furnace remains evacuated. Thus as upper face sheet 12 lowers into contact with cellular core 10 and diffusion bonds therewith and as lower face sheet 14 diffusion bonds with cellular core 10, the individual cells of cellular core 10 are sealed in the evacuated condition. Because of the uniformity of the diffusion bond obtained by the method of this invention, the structural composite panels have been found to maintain evacuated cells during their service life. When used in typical aerospace applications, these panels, because of their cell evacuation are free from the problems of water condensation and consequent ice formation which has been found to be destructive of prior art honeycomb panels. Also because of the high vacuum maintained in the individual cells of cellular core 10, drastic internal pressure increases in the structural composite are greatly reduced when it is subjected to atmospheric pressure and temperature changes when used on vehicles operating between sea level and altitudes of up to 70,000 feet or more. Furthermore, titanium metal alloys and the high-strength refractory metal alloys have been found to be particularly susceptible to corrosion, stress-corrosion cracking, and various imbrittlement effects when subjected to normal service environment. These effects are greatly reduced or eliminated within the internal cellular core structure 10 of a composite panel fabricated according to the teachings of this invention because of the high vacuum maintained within the individual cells.

In certain applications it may be desirable not to maintain a vacuum within cellular core 10 of the completely fabricated structural panel but rather it may be desirable to introduce a controlled gaseous atmosphere within the cellular core 10. Such a need may arise where the structural composite is to be used in submarine or other hydrospace-type vehicles. In this case, after the vacuum furnace has been evacuated to remove organic and other contaminants, an inert gas such as argon may be introduced into the vacuum furnace before its temperature has been elevated to the fiber softening point of the glass supports. Then after the face sheets have been diffusion bonded to the cellular core 10, the inert gas will be entrapped and sealed within the cells of cellular core 10. In certain other instances it may be desirable to diffusion bond the components in a high pressure autoclave since the contaminants could be removed by the introduction of a heavy inert gas that would displace the organic contaminants and the oxygen included on the component surfaces. The presence of the heavy inert gas would prevent the formation of oxide on the bonding surfaces as the temperature of the furnace is elevated to the diffusion bonding temperature. The heavy inert gas could then either be evacuated before the surface reaches the fiber softening point of the glass supports or the heavy inert gas could be retained within the furnace and sealed within cellular core 10 as face sheets 12 and 14 are diffusion bonded thereto. High internal pressure provided by this gas could greatly increase the compressive strength of the structure. It is apparent, therefore, that the practice of this invention allows considerable flexibility in both the manner in which contaminants are removed from the face sheet and cellular core components and in the type of atmosphere that is desired to be maintained within the cells of the cellular core after the fabrication has been completed.

For illustrative purposes only, the following describes the process in which a one-half inch thick commercially pure titanium honeycomb core component having approximately square cells with about one-quarter inch sides and a cell wall of 0.001 inch was diffusion bonded to two 0.012 inch thick face sheets of Ti-6A1-4V. The surfaces of the face sheets were hand polished with 600 grit paper before assembly and the bottom surface of the lower face sheet and the top surface of the top face sheet were coated with a boron nitride parting agent. The upper face sheet was supported approximately 0.75 inch above the cellular core component by means of glass supports made of KG-33 borosilicate glass plate. One-eighth inch thick KG-33 borosilicate pads were inserted between the vacuum furnace hearth and the lower face sheet and between the dead weight and the upper face sheet. The dead weight was selected to apply a compressional force of about 15 p.s.i. at the edges of the cell walls at the bond interface. After the setup was complete, the vacuum furnace was evacuated to about 2×10⁻⁵ torr and elevated to a temperature of approximately 1,500° F. at which time the glass supports yielded and the upper face sheet lowered into surface contact with the cellular core. The vacuum furnace was additionally heated to about 1,700° F. and held at that temperature for approximately 5 hours to secure a uniform diffusion bond between the upper and lower edges of the cell walls and the upper and lower face sheets respectively. After the furnace was permitted to cool the structural composite was subjected to various structural tests which indicated that uniform continuous bond was obtained between the face sheet and the cellular core. Sections cut from the composite panel showed that no permanent deformation or crushing occurred at the nodes of the honeycomb cells.

What is claimed is:

1. A method of fabricating a metallic composite structure taking a relatively fragile metallic cellular core component sandwiched between and diffusion bonded to two metallic face sheet components, said cellular core component having individual cells with a controlled atmosphere sealed therein, comprising the steps of:
   a. assembling the core component between the two face sheet components in a furnace with at least one of the face sheet components spaced apart from the core component with heat yieldable spacer means; said heat yieldable spacer means having a yield point at an elevated temperature;
   b. forming a controlled atmosphere within the furnace containing the cellular core component and within the individual cells of the cellular core component;
   c. while substantially maintaining the controlled atmosphere of step (b), elevating the temperature of the furnace containing the components and the heat yieldable spacer means to at least the yield point of the heat yieldable spacer means; and simultaneously
   d. applying a compressive force between the two face sheet components and the core component, said compressive force being sufficient to overcome the heat yieldable spacer means but insufficient to crush the core component;
   whereby the face sheet components are urged into intimate surface contact with and diffusion bonded to the core component along substantially the entire interface therebetween, thereby sealing the controlled atmosphere within the individual cells of the cellular core component.

2. A method of fabricating a metallic composite structure having a relatively fragile metallic cellular core component sandwiched between and diffusion bonded to upper and lower metallic face sheet components, said cellular core component having individual cells with a controlled atmosphere sealed therein, comprising the steps of:
   a. assembling the core component between the upper and lower face sheet components in a furnace with the core component resting upon and in surface contact with the lower face sheet component, and with the upper face sheet component spaced above and apart from the core component with glass support means, said glass support means having a fiber softening point at an elevated temperature;
   b. forming a controlled temperature within the furnace containing the cellular core component and within the individual cells of the cellular core component;
   c. while substantially maintaining the controlled atmosphere of step (b), elevating the temperature of the furnace containing the components and the glass support means to at least the fiber softening point of the glass support means, whereby the glass support means yield and the upper face sheet component lowers into surface contact with the core component; and
   d. while substantially maintaining the temperature of step (c), applying a compressive force to the components, said compressive force being less than that which would crush the core component, to diffusion bond the core component to the upper and lower face sheet components along substantially the entire interface therebetween, thereby sealing the controlled atmosphere within the individual cells of the cellular core component.

3. The method as claimed in claim 1 wherein the step of forming a controlled atmosphere within the furnace and within the individual cells of the cellular core component comprises the steps of:
   a. evacuating the furnace to remove contaminants from the components and from the individual cells of the cellular core component; and
   b. introducing an inert gas into the furnace and into the individual cells of the cellular core component.

4. A method of fabricating a metallic composite structure having a relatively fragile metallic cellular core component sandwiched between and diffusion bonded to two metallic face components comprising the steps of:
   a. assembling the core component between the two face sheet components in a vacuum furnace with at least one of the face sheet components spaced apart from the core component with glass spacer means, said glass spacer means having a fiber softening point at an elevated temperature;
   b. evacuating the vacuum furnace to remove contaminants from the components;
   c. while substantially maintaining the vacuum of step (b), elevating the temperature of the vacuum furnace containing the components and the glass spacer means to at least the fiber softening point of the glass spacer means; and simultaneously
   d. applying a compressive force between the two face sheet components and the core component, said compressive force being sufficient to overcome the softened glass spacer means but insufficient to crush the core component;
   whereby the face sheet components are urged into intimate surface contact with and diffusion bonded to the core component along substantially the entire interface therebetween.

5. A method of fabricating a metallic composite structure having a relatively fragile metallic cellular core component sandwiched between and diffusion bonded to upper and lower metallic face sheet components comprising the steps of:
   a. assembling the core component between the upper and lower face sheet components in a vacuum furnace with the core component resting upon and in surface contact with the lower face sheet component, and with the upper face sheet component spaced above and apart from the core component with glass support means, said glass support means having a fiber softening point at an elevated temperature;
   b. evacuating the vacuum furnace to remove contaminants from the components;
   c. while substantially maintaining the vacuum of step (b), elevating the temperature of the vacuum furnace containing the components and the glass support means to at least the fiber softening point of the glass support means; whereby the glass support means yield and the upper face sheet component lowers into surface contact with the core component; and
   d. while substantially maintaining the temperature of step (c), applying a compressive force to the components, said compressive force being less than that which would crush the core component, to diffusion bond the core component to the upper and lower face sheet components along substantially the entire interface therebetween.

6. The method as claimed in claim 1 wherein the compressive force applied in step (d) is applied through a glass media in surface contact with the face sheet components, said glass media having a fiber softening point at a temperature not greater than the temperature to which the furnace is elevated in step (c); whereby the compressive force is uniformly distributed over the face sheet components and local crushing of the core component due to irregularities in the thickness tolerances of the core component is avoided.

7. A method of fabricating a titanium honeycomb structural panel having an evacuated cellular titanium core component sandwiched between and diffusion bonded to upper and lower titanium face sheet components, said cellular core component having a characteristic cell wall thickness of about 0.001 to 0.002 inch, comprising the steps of:
  a. assembling the core component between the upper and lower face sheet components in a vacuum furnace with the core component resting upon and in surface contact with the lower face sheet component, and with the upper face sheet component spaced above and apart from the core component with glass support means, said glass support means comprising a borosilicate glass having a fiber softening point of about 1,400° to 1,600° F.;
  b. evacuating the vacuum furnace to at least $10^{-3}$ torr to remove contaminants and to evacuate the cellular spaces of the core component;
  c. while substantially maintaining the vacuum of step (b), elevating the temperature of the vacuum furnace containing the components and the glass support means to at least the fiber softening point of the glass support means; whereby the glass softens and the upper face sheet component lowers into surface contact with the core component; and then
  d. additionally elevating the temperature of the vacuum furnace to about 1,700° to 1,800° F. and applying a compressive force to the components of about 10 p.s.i. to 15 p.s.i. at the interface of the core component and the face sheet components to diffusion bond the core component to the upper and lower face sheet components along substantially the entire interface therebetween, thereby sealing the evacuated cell spaces of the cellular core component.

8. The method as claimed in claim 7 wherein the compressive force applied in step (d) is applied through a borosilicate glass media in surface contact with the face sheet components, and borosilicate glass media having a fiber softening point of about 1,400° to 1,600° F.; whereby the compressive force is uniformly distributed over the face sheet components and local crushing of the core component due to irregularities in the thickness tolerances of the core component is avoided.

9. The method as claimed in claim 2 wherein the step of forming a controlled atmosphere within the furnace and within the individual cells of the cellular core component comprises the steps of:
  a. evacuating the furnace to remove contaminants from the components and from the individual cells of the cellular core component; and
  b. introducing an inert gas into the furnace and into the individual cells of the cellular core component.

10. The method as claimed in claim 2 wherein the compressive force applied in step (d) is applied through a glass media in surface contact with the face sheet components, said glass media having a fiber softening point at a temperature not greater than the temperature to which the furnace is elevated in step (c); whereby the compressive force is uniformly distributed over the face sheet components and local crushing of the core component due to irregularities in the thickness tolerances of the core component is avoided.

11. The method as claimed in claim 4 wherein the compressive force applied in step (d) is applied through a glass media in surface contact with the face sheet components, said glass media having a fiber softening point at a temperature not greater than the temperature to which the furnace is elevated in step (c); whereby the compressive force is uniformly distributed over the face sheet components and local crushing of the core component due to irregularities in the thickness tolerances of the core component is avoided.

12. The method as claimed in claim 5 wherein the compressive force applied in step (d) is applied through a glass media in surface contact with the face sheet components, said glass media having a fiber softening point at a temperature not greater than the temperature to which the furnace is elevated in step (c); whereby the compressive force is uniformly distributed over the face sheet components and local crushing of the core component due to irregularities in the thickness tolerances of the core component is avoided.

* * * * *